United States Patent [19]

Ohta

[11] 4,313,917
[45] Feb. 2, 1982

[54] METHOD OF DEFOAMING AMINE SOLUTIONS

[75] Inventor: Kazuro Ohta, Yokohama, Japan

[73] Assignee: Nippon Petroluem Refining Company Limited, Tokyo, Japan

[21] Appl. No.: 158,231

[22] Filed: Jun. 10, 1980

[51] Int. Cl.³ .............................................. B01D 53/34
[52] U.S. Cl. .................................. 423/228; 423/229; 252/321; 252/358
[58] Field of Search ............... 423/220, 226, 228, 229; 252/358, 321

[56] References Cited

U.S. PATENT DOCUMENTS

| | | | |
|---|---|---|---|
| 1,944,122 | 1/1934 | Fife | 423/229 |
| 2,390,899 | 12/1945 | Reed | 423/228 |
| 2,826,516 | 3/1958 | Froning et al. | 423/229 |
| 4,208,385 | 6/1980 | Robbins et al. | 423/228 X |

Primary Examiner—Earl C. Thomas
Attorney, Agent, or Firm—Bucknam and Archer

[57] ABSTRACT

A process is disclosed for inhibiting or eliminating foams and bubbles produced in the course of treating acidic gases with an aqueous solution. Defoaming is effected by the use of a modified silicone compound having the general formula $$R_1-\underset{\underset{R_3}{|}}{\overset{\overset{R_2}{|}}{Si}}-O(\underset{\underset{R_5}{|}}{\overset{\overset{R_4}{|}}{Si}}O)_{\overline{n}}\underset{\underset{R_7}{|}}{\overset{\overset{R_6}{|}}{Si}}-R_8$$

where $R_1$–$R_8$ are organic residues of 1–10 carbons, and n is an integer, and characterized by part of $R_1$–$R_8$ being substituted by a group of the general formula $$-R_9-OH$$

where $R_9$ is a hydrocarbon or organic residue of 1–10 carbons; or characterized by part of $R_1$–$R_8$ being substituted by a group of the general formula $$-NR_{10}R_{11}$$

where $R_{10}$ and $R_{11}$ are either hydrogen or hydrocarbon or organic residue of 1–10 carbons.

7 Claims, 1 Drawing Figure

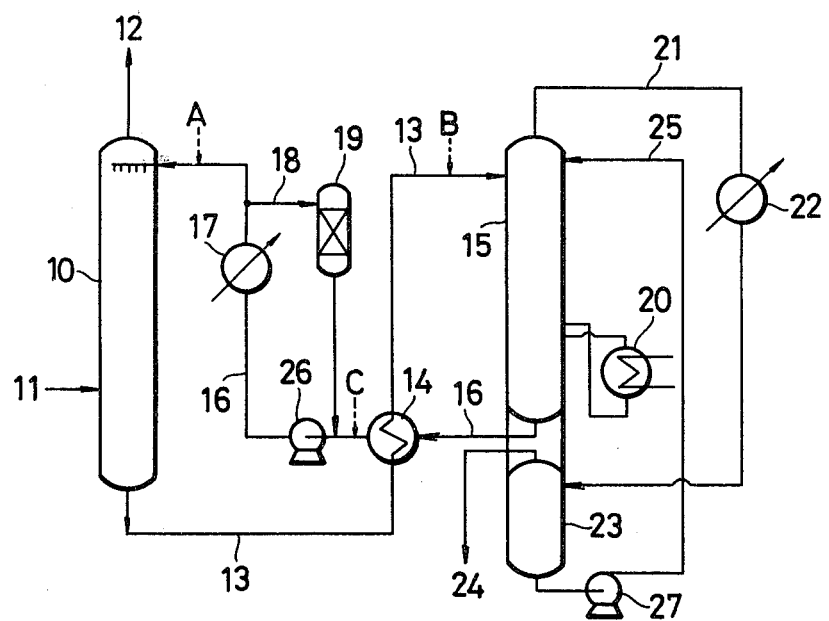

METHOD OF DEFOAMING AMINE SOLUTIONS

BACKGROUND OF THE INVENTION

1. Field of the Invention

This invention relates to a method of defoaming amine solutions which are used to absorb acidic gases, and more particularly to a method of removing foams which may develop in an amine solution while maintained in continuous contact with such a gas as containing hydrogen sulfide or carbon dioxide.

2. Prior Art

It has been an established practice to bring hydrogen sulfide-containing or carbon dioxide-containing gases into absorptive contact with an aqueous amine solution thereby recovering hydrogen sulfide or carbon dioxide from the respective gases. However, when this contacting operation is continued for a prolonged period of time, the amine solution is liable to undergo foaming or bubbling in the system which would in turn induce increased pressure differential between an absorption unit and a recovery unit, or abnormal liquid level, or entrainment of the amine solution downstream of the unit, or in the worst case, shutdown of the whole plant. To suppress or otherwise eliminate the foams and bubbles, it has been proposed to add some defoaming agents such as higher alcohols, petroleum lubricating oil fractions, esters, silicone oils, and the like.

Such defoaming materials however are not satisfactory for the purpose of defoaming an aqueous amine solution when this is used to treat acidic gases.

SUMMARY OF THE INVENTION

It is a general object of the invention to provide a novel method of removing foams which may be produced in an aqueous amine solution on continued contact with an acidic gas.

A more specific object of the invention is to provide a method of defoaming or removing foams from an aqueous amine solution-gas system with use of novel foam inhibitors.

DETAILED DESCRIPTION OF THE PREFERRED EMBODIMENTS

When an aqueous amine solution is brought into contact with acidic gases over extended periods of time, there are produced some heavy oxygen-containing compounds which are believed to induce foams and bubbles. This has been ascertained by tests of both heavy fractions (still residue) and light fractions obtained by distillation of an amine solution which has been continuously used and hence is susceptible to foam. The heavy and light distillates were respectively added to a fresh aqueous amine solution to make their respective 30% amine solutions which were then tested for foaming with the result that the heavy distillate-containing amine solution developed vigorous foams and bubbles, while that of light distillate was found substantially foam-free.

The heavy oxygen-containing compound suspected to be the cause for foaming has been determined by elementary analysis, then by gas chromatograph, mass spectrograph and infrared spectrograph, and as a result, is believed to possess the following formula:

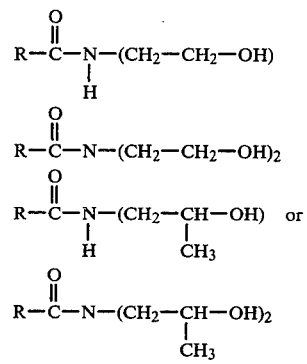

Such compounds may be produced by complex reactions of hydrogen sulfide, amine and oxygen present in appreciable amounts in the system, or from an amine solution which contains impurities such as esters and fatty acids.

Acidic gases containing hydrogen sulfide or carbon dioxide referred to herein are typically available from the process of refining petroleum oils, examples of which include gases produced during hydrodesulfurization of naphtha, kerosene, light oil, lubricating oil fractions, waxes, vacuum distillates and atmospheric or vacuum residues of crude oils, or mixtures thereof; hydrogen sulfide-containing gases which may be taken overhead during distillation of crude oils; hydrogen sulfide-containing gases which may be produced during fluidized catalytic cracking of petroleum oils; hydrogen sulfide-containing gases which may be produced during distillation of gasolines in a stabilizer; and carbon dioxide-containing gases which may be produced during steam reforming of methane or light naphtha. The hydrogen sulfide-containing gases may contain, other than hydrogen sulfide, one or more of components of the class consisting of hydrogen, carbon monoxide, ammonium, light hydrocarbons, nitrogen, nitrogen monoxide, nitrogen dioxide, sulfur dioxide, sulfur trioxide, vapors and mercaptans.

Acidic gases of the above class are contacted with an aqueous solution of amine such as diethanol amine and diisopropanol amine normally in a gas-liquid phase at a temperature in the range of 0°–40° C., preferably near 30° C., and at atmospheric or slightly added pressure. The amine solution under contemplation may have amine concentrations of usually 10–30 weight percent, or may preferably be of the order of 2 mols.

It is a common practice to employ a vertically mounted vessel or cylindrical drum for effecting the contact of droplets or mists of an aqueous amine solution supplied from above the vessel with an acidic gas supplied from below the vessel, whereby hydrogen sulfide and/or carbon dioxide in the gas is absorbed by the amine solution. Gaseous materials devoid of such sulfide or dioxide are vented off from the top of the vessel where there is usually provided a demister to prevent escape of the amine solution. The solution now having absorbed thereto hydrogen sulfide or carbon dioxide forms a liquid layer at the bottom of the vessel which is withdrawn at a rate commensurate with the feed of amine solution and transferred to an amine regenerator wherein absorbed hydrogen sulfide or carbon dioxide is released, with refreshed amine solution recycled to the contact vessel. The amine regenerator or recovery unit for hydrogen sulfide or carbon dioxide usually comprises a heater and a distillator or stripper.

Aqueous amine solutions undergo foaming or bubbling when maintained in continued contact with acidic gases over periods of about 10 days to 5 months.

It has now been found that foam inhibitors comprising certain modified silicones are effective for suppressing or eliminating the foams or bubbles in the amine solutions.

The foam inhibitor according to the invention is a compound having the general silicone formula:

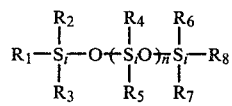

where $R_1$-$R_8$ are organic residues of 1-10 carbons, and n is an integer, and characterized by part of $R_1$-$R_8$ being substituted by a group of the general formula:

where $R_9$ is a hydrocarbon or organic residue of 1-10 carbons, or characterized by part of $R_1$-$R_8$ substituted by a group of the general formula:

where $R_{10}$ and $R_{11}$ are either hydrogen or hydrocarbon or organic residue of 1-10 carbons.

Modified silicone compounds having 1-2 hydroxyl groups in $R_{10}$ or 2-3 hydroxyl groups as a whole are also eligible for the purpose of the invention. $R_1$ through $R_8$ are generally hydrocarbon residues but may be partly substituted by an ether or ester group. The alcohol (—$R_9$—OH) modified silicone compound according to the invention should have a viscosity of the order of 10-500 cSt, preferably 50-100 cSt and a refractive index of the order of 1.4-1.5.

The amino (—$NR_{10}R_{11}$) modified silicone compound according to the invention should have a substitution degree by amine equivalent of the order of 100-1,000, preferably 250-500, more preferably 300-500, and a viscosity of the order of 10-200 cSt, preferably 20-150 cSt.

Either of the two modified silicone compounds may be added in amounts of 3-200 weight ppm, preferably 5-160 weight ppm, based on amine solution.

In the practice of the invention, the modified silicone compounds or foam inhibitors according to the invention may be introduced either directly into the contact vessel or into the stream of amine solution prior to entry to the vessel.

FIG. 1 illustrates the apparatus used to carry out the process in accordance with the present invention.

In the figure, numeral 10 designates a contact tower for carrying out absorption of an aqueous amine solution with gases which contain $H_2S$, the latter being introduced through line 11. Numeral 12 is the line through which the gaseous components free of hydrogen sulfide are eliminated. Numeral 13 is the line through which the amine solution having hydrogen sulfide absorbed is led from the tower 10 to tower 15 where the amine is regenerated. Numeral 14 is a heat-exchanger. The amine solution is stripped of hydrogen sulfide in the regenerator 15 and is then recycled through line 16 and heat exchangers 14 and 17 to the tower 10. The stream in line 16 may be supplied to a vessel 19 which contains active carbon. The amine solution is heated by the heater 20, stripped of hydrogen sulfide which is withdrawn overhead from the generator 15 and sent through line 21 to receiver 23 from the top of which a gaseous material containing predominantly hydrogen sulfide is withdrawn through line 24. The bottom from the receiver 23 is recycled through line 25 to the regenerator tower 15. Numerals 26 and 27 are pumps.

It has now also been found that the effect of defoaming can be further enhanced by contacting the amine solution in part or whole with active carbon, at about 10°C. -50° C., preferably 15°-30° C., before or after the former is added with the modified silicone compounds.

While the exact reasons are unknown for the specified silicone compounds according to the invention being capable of excellent defoaming performance, the results may be attributed to the facts that such silicone compounds, as compared to conventional defoaming agents, have greater affinity to the foam-inducing materials; can be readily diffused and dispersed in and over the surfaces of foams; are less soluble in an amine solution; thermally stable; and smaller in specific gravity than an aqueous amine solution.

The invention will be further described by way of the following examples.

EXAMPLE 1

Gases resulting from hydrodesulfurization of vacuum distillates of crude oil and containing 51.3 vol. % of $H_2S$, 19.6 vol. % of $H_2$, 19.1 vol. % of methane and 10 vol. % of $C_2$-$C_4$ hydrocarbons were maintained in continuous contact with an aqueous solution of 30% diisopropanol amine. Foaming took place. 200 milliliters of liquid portion of foamed amine solution were taken into a plurality of 1,000 milliliter measuring cylinders, into which air was introduced at one liter per minute through a diffuser stone until foams reached a predetermined level. This level or height of foams was recorded, and then air supply was discontinued. Time was measured between the point of discontinuation of air supply and the point of elimination of foams or bubbles.

The alcohol modified silicone of the invention was added under similar conditions in different amounts to amine solution samples having different foam heights, defoaming effects thereby obtained being shown in Table 1. In the Tables the abbreviation "IPA" indicates "isopropyl alcohol".

For purposes of comparison, conventional defoaming agents were tested under similar conditions with the results shown in Table 2.

TABLE 1

| Foam Inhibitors | Amount (ppm) | Foam Height (cm) | Defoaming Time |
|---|---|---|---|
| Alkyleneglycol substituted, oil type dimethyl silicone having viscosity of 80 cSt and refractive index of 1.42 g | 0 | 40.0(+) | 10 min(+) |
| | 10 | 17.5 | 40 sec |
| | 20 | 4.7 | 7 sec |
| | 40 | 1.5 | 4 sec |
| | 60 | 0.7 | 2 sec |
| | 80 | 0 | — |
| | 160 | 0 | — |

TABLE 2

| Foam Inhibitors | Amount (ppm) | Foam Height (cm) | Defoaming Time |
|---|---|---|---|
| Diethylhexyl acrylate | 0 | 40.0(+) | 10 min(+) |
| | 20 | 40.0(+) | 4 min |
| | 70 | 28.0 | 2 min |
| | 100 | 3.0 | 7 sec |
| | 140 | 11.5 | 40 sec |
| | 180 | 2.0 | 3 sec |
| | 220 | 2.0 | 3 sec |
| | 260 | 6.0 | 20 sec |
| | 360 | 15.5 | 1 min |
| | 560 | 3.5 | 6 sec |
| | 760 | 2.5 | 3 sec |
| | 960 | 4.5 | 8 sec |
| Dimethyl silicone (100 cSt, polymerization degree n = 70) | 0 | 40.0(+) | 10 min(+) |
| | 20 | 40.0(+) | 6 min 40 sec |
| | 60 | 40.0(+) | 3 min 50 sec |
| | 200 | 40.0(+) | 2 min 30 sec |
| | 400 | 40.0(+) | 2 min |
| | 600 | 40.0(+) | 5 min 30 sec |
| | 800 | 40.0(+) | 5 min 30 sec |
| Dimethyl silicone (300 cSt, polymerization degree n = 200) | 0 | 40.0(+) | 10 min(+) |
| | 20 | 40.0(+) | 7 min |
| | 100 | 40.0(+) | 5 min |
| | 600 | 40.0(+) | 7 min 30 sec |
| Oleyl alcohol/IPA solution (1:1) | 0 | 40.0(+) | 10 min(+) |
| | 20 | 40.0(+) | 7 min |
| | 60 | 8.5 | 2 min |
| | 100 | 2.0 | 4 sec |
| | 140 | 1.5 | 3 sec |
| | 180 | 1.5 | 3 sec |
| | 220 | 1.0 | 2 sec |
| | 250 | 0 | — |
| | 300 | 0 | — |

EXAMPLE 2

Gases resulting from hydrodesulfurization of vacuum distillates of crude oil and containing 54.2 vol. % of $H_2S$, 18.5 vol. % of $H_2$, 18.2 vol. % of methane and 9.1 vol. % of $C_2$–$C_4$ hydrocarbons were maintained in continuous contact with an aqueous solution of 30% diisopropanol amine. Foaming took place. 200 milliliters of liquid portion of foamed amine solution were taken into a plurality of 1,000 milliliter measuring cylinders, into which air was introduced at one liter per minute through a diffuser stone until foams reached a predetermined level. This level or height of foams was recorded, and then air supply was discontinued. Time was measured between the point of discontinuation of air supply and the point of elimination of foams or bubbles.

The amino modified silicone of the invention was added under similar conditions in different amounts to amine solution samples having different foam heights, defoaming effects thereby obtained being shown in Table 3.

For purposes of comparison, conventional defoaming agents were tested under similar conditions with the results shown in Table 4.

TABLE 3

| Foam Inhibitors | Amount (ppm) | Foam Height (cm) | Defoaming Time |
|---|---|---|---|
| Amino silicone (amino substituted dimethyl silicone) viscosity: 150 cSt amine equivalent: 530 refractive index: 1.475 | 0 | 40.0(+) | 10 min(+) |
| | 10 | 30.0 | 2 min |
| | 20 | 2.0 | 5 sec |
| | 40 | 0.7 | 2 sec |
| | 60 | 0 | — |
| | 160 | 0 | — |
| Amino silicone (amino substituted dimethyl silicone) viscosity: 60 cSt amine equivalent: 360 refractive index: 1.421 | 0 | 40.0(+) | 10 min(+) |
| | 10 | 25.5 | 1 min |
| | 20 | 2.5 | 7 sec |
| | 40 | 0.7 | 2 sec |
| | 60 | 0 | — |
| | 160 | 0 | — |

TABLE 4

| Foam Inhibitors | Amount (ppm) | Foam Height (cm) | Defoaming Time |
|---|---|---|---|
| Diethylhexyl acrylate | 0 | 40.0(+) | 10 min(+) |
| | 20 | 40.0(+) | 4 min |
| | 70 | 28.0 | 2 min |
| | 100 | 3.0 | 7 sec |
| | 140 | 11.5 | 40 sec |
| | 180 | 2.0 | 3 sec |
| | 220 | 2.0 | 3 sec |
| | 260 | 6.0 | 20 sec |
| | 360 | 15.5 | 1 min |
| | 560 | 3.5 | 6 sec |
| | 760 | 2.5 | 3 sec |
| | 960 | 4.5 | 8 sec |
| Dimethyl silicone (100 cSt, polymerization degree n = 70) | 0 | 40.0(+) | 10 min(+) |
| | 20 | 40.0(+) | 6 min 40 sec |
| | 60 | 40.0(+) | 3 min 50 sec |
| | 200 | 40.0(+) | 2 min 30 sec |
| | 400 | 40.0(+) | 2 min |
| | 600 | 40.0(+) | 5 min 30 sec |
| | 800 | 40.0(+) | 5 min 30 sec |
| Dimethyl silicone (300 cSt, polymerization degree n = 200) | 0 | 40.0(+) | 10 min(+) |
| | 20 | 40.0(+) | 7 min |
| | 100 | 40.0(+) | 5 min |
| | 600 | 40.0(+) | 7 min 30 sec |
| Oleyl alcohol/IPA solution (1:1) | 0 | 40.0(+) | 10 min(+) |
| | 20 | 40.0(+) | 7 min |
| | 60 | 8.5 | 2 min |
| | 100 | 2.0 | 4 sec |
| | 140 | 1.5 | 3 sec |
| | 180 | 1.5 | 3 sec |
| | 220 | 1.0 | 2 sec |
| | 250 | 0 | — |
| | 300 | 0 | — |

EXAMPLE 3

The procedure of Example 2 was followed, except that diethanol amine was used in place of diisopropanol amine, with the results shown in Table 5.

TABLE 5

| Foam Inhibitors | Amount (ppm) | Foam Height (cm) | Defoaming Time |
|---|---|---|---|
| Amino silicone (amino substituted dimethyl silicone) viscosity: 150 cSt amine equivalent: 530 refractive index: 1.475 | 0 | 10.0 | 10 min(+) |
| | 10 | 2.0 | 4 sec |
| | 20 | 0.7 | 1 sec |
| | 40 | 0 | — |
| Dimethyl silicone (300 cSt, polymerization degree n = 200) | 0 | 10.0 | 10 min(+) |
| | 20 | 2.0 | 3 sec |
| | 40 | 1.0 | 2 sec |
| | 60 | 0 | — |
| Diethylhexyl acrylate | 0 | 10.0 | 10 min(+) |
| | 20 | 5.0 | 10 min |
| | 40 | 4.5 | 10 min |
| | 60 | 3.5 | 6 min |
| | 80 | 0 | — |
| Oleyl alcohol/IPA solution | 0 | 10.0 | 10 min(+) |

TABLE 5-continued

| Foam Inhibitors | Amount (ppm) | Foam Height (cm) | Defoaming Time |
|---|---|---|---|
| (1:1) | 10 | 2.0 | 3 sec |
| | 20 | 1.0 | 2 sec |
| | 40 | 2.0 | 3 sec |
| | 60 | 3.5 | 5 sec |
| | 100 | 3.5 | 5 sec |
| | 200 | 7.0 | 6 sec |
| | 300 | 10.0 | 10 sec |

EXAMPLE 4

The accompanying drawing illustrates by way of example an equipment layout for removing hydrogen sulfide from mixed gases produced during refining of petroleum oil. The apparatus comprises a contact tower 10 for effecting absorptive contact of an aqueous amine solution with H₂S-containing gases which are introduced via line 11. Gaseous components free of H₂S are taken overhead through line 12. The amine solution with H₂S absorbed thereto is supplied via line 13 and heat exchanger 14 to an amine regenerator tower 15. The amine solution stripped of H₂S in the generator 15 is recycled via line 16 and heat exchangers 14 and 17 back to the tower 10. Part of the stream in line 16 may be supplied via line 18 to a vessel 19 charged with active carbon. The amine solution is heated by heater 20 and thereby stripped of H₂S which is withdrawn overhead from the generator 15 and sent via line 21 and cooler 22 to a receiver 23, from the top of which is withdrawn via line 24 a gaseous material predominantly containing H₂S. Bottoms of the receiver 23 are recycled via line 25 to the generator tower 15. Designated at 26 and 27 are pumps.

Diethanol amine or diisopropanol amine solution undergoes foaming or bubbling upon contact with H₂S-containing gases in the contact tower 10 or in the generator tower 15, which will in turn invite pressure fluctuation and abnormal increase in liquid level, making the equipment operation difficult to continue. Such operating disturbances may be readily shown by appropriate alarms, whereupon the operator can inject the modified silicone foam inhibitors of the invention to the apparatus through selected points A, B and C adjacent to the origin of foams and bubbles. The foam inhibitor may be charged in an amount of about 500 cc which corresponds to 5–10 ppm based on the total retention of amine solution within the apparatus.

What is claimed is:

1. In the process of continuously contacting acidic gases containing principally hydrogen sulfide or carbon dioxide with an aqueous amine solution, resulting in the development of foams or bubbles in the system, the improvement which comprises adding to the system a foam inhibitor having the general silicone formula:

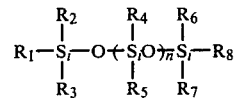

where $R_1$–$R_8$ are organic residues of 1–10 carbons, and n is an integer, and characterized by part of $R_1$–$R_8$ being substituted by a group of the general formula:

$$-R_9-OH$$

where $R_9$ is a hydrocarbon or organic residue of 1–10 carbons; or characterized by part of $R_1$–$R_8$ being substituted by a group of the general formula:

$$-NR_{10}R_{11}$$

where $R_{10}$ and $R_{11}$ are either hydrogen or hydrocarbon or organic residue of 1–10 carbons.

2. The improvement as claimed in claim 1, wherein said amine solution is diethyl amine.

3. The improvement as claimed in claim 1, wherein said amine is diisopropanol amine.

4. The improvement as claimed in claim 1, wherein said acidic gases are available from refining of petroleum oils.

5. The improvement as claimed in claim 1 which further comprises contacting said amine solution with active carbon either before or after said foam inhibitor is added.

6. The process according to claim 1 wherein in said foam inhibitor part of $R_1$–$R_8$ is substituted by a group $R_9$—OH and the foam inhibitor has a viscosity of the order of 10–500 cSt and refractive index 1.4–1.5.

7. The process according to claim 1 wherein in said foam inhibitor part of $R_1$–$R_8$ is substituted by the group $NR_{10}R_{11}$ said foam inhibitor having a substitution degree by amine equivalent of 100–1000 and viscosity of the order of 10–200 cSt.

UNITED STATES PATENT AND TRADEMARK OFFICE
CERTIFICATE OF CORRECTION

PATENT NO. : 4,313,917
DATED : February 2, 1982
INVENTOR(S) : Kazuro Ohta

It is certified that error appears in the above—identified patent and that said Letters Patent is hereby corrected as shown below:

On the title page, Item [30] should be added to read:

-- FOREIGN APPLICATION PRIORITY DATA: June 12, 1979
    Japan        54-73750 --.

Signed and Sealed this

Twentieth Day of April 1982

|SEAL|

Attest:

GERALD J. MOSSINGHOFF

*Attesting Officer*     *Commissioner of Patents and Trademarks*